Jan. 5, 1937. J. T. FITZSIMMONS ET AL 2,067,079
DISTRIBUTOR LUBRICATION
Filed April 15, 1933
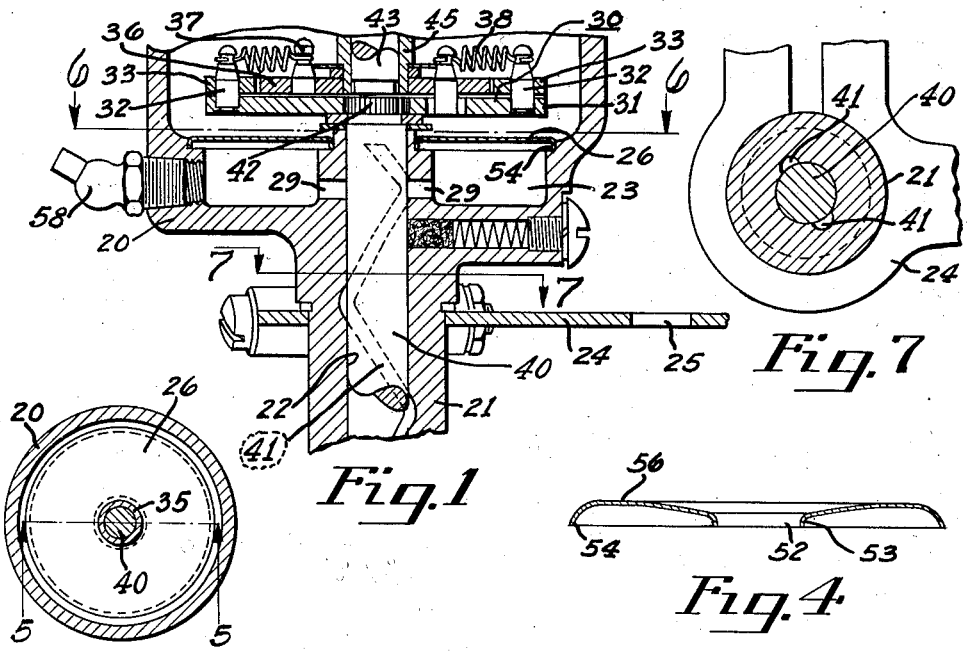
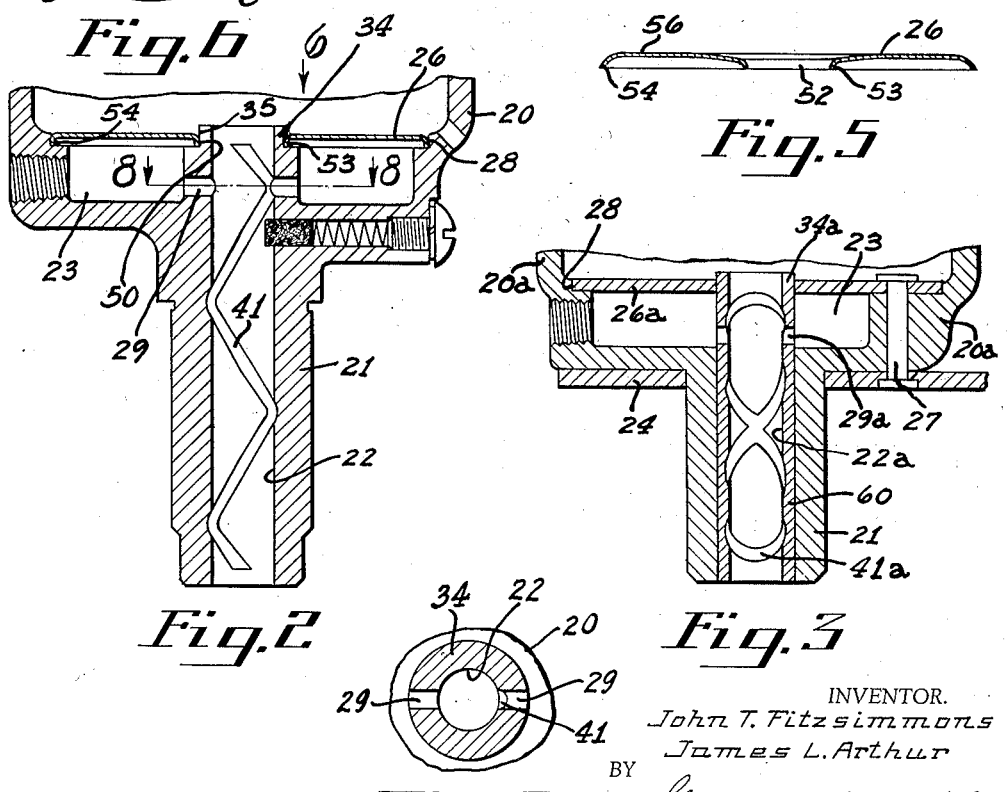
INVENTOR.
John T. Fitzsimmons
James L. Arthur
BY
Spencer, Hardman & Fehr
ATTORNEYS.

Patented Jan. 5, 1937

2,067,079

UNITED STATES PATENT OFFICE 2,067,079

DISTRIBUTOR LUBRICATION

John T. Fitzsimmons and James L. Arthur, Anderson, Ind., assignors, by mesne assignments, to General Motors Corporation, Detroit, Mich., a corporation of Delaware Application April 15, 1933, Serial No. 666,260

3 Claims. (Cl. 308—121)

This invention pertains to ignition systems and has for an object to provide an ignition distributor adaptable to high speed operation on multicylinder engines, and constitutes that that is carved out of the application on which Patent Number 1,869,098 was granted July 26, 1932, and filed after the grant of that patent.

One object of this invention is to provide adequate and positive lubricating means for certain working parts of the timer-distributor unit. This is accomplished by forming a substantially lubricant tight chamber in the base of the distributor housing and providing a communicating passage or passages from the chamber leading to the bearing of the distributor shaft so that there is at least periodic communication between the said chamber and an oil groove or passage provided by either the distributor shaft or its bearing.

Further objects and advantages of the present invention will be apparent from the following description, reference being had to the accompanying drawing wherein a preferred embodiment of one form of the present invention is clearly shown.

In the drawing:

Fig. 1 is a vertical section in fragmentary showing through an ignition device of the class described and illustrating our invention.

Fig. 2 is a detail view of the distributor housing with the movable parts removed.

Fig. 3 is a similar view of a modification showing in detail one application of our invention.

Fig. 4 is a sectional view illustrating in detail, a part of the improvement contributing to this invention.

Fig. 5 is a sectional view of a modification of a part contributing to the invention substantially as indicated by the line and arrows 5—5 of Fig. 6.

Fig. 6 is a plan view on reduced scale, of one modification of our invention substantially as indicated by the line and arrows 6—6 in Fig. 1, and as indicated by the arrow 6 of Fig. 2.

Fig. 7 is a cross sectional view through the shank of the distributor housing and the distributor shaft depicting certain features of our invention, the view being substantially as indicated by the line and arrows 7—7 of Fig. 1.

Fig. 8 is a sectional view substantially as indicated by the line and arrows 8—8 of Fig. 2 certain parts being broken away.

With particular reference to the drawing, 20 refers to a cup member housing a governor mechanism or speed responsive means 30 and that differentially connects a drive shaft 40 with a cam carrying shaft 45 as will presently appear. The governor cup 20 is formed with a shank 21 that provides a bearing 22 for the drive shaft 40. As illustrated in Figs. 1 and 2 the shank 21 is provided with a bore to form the bearing for the shaft 40. About the shank 21 is a clamp bracket or actuating arm 24 having an apertured ear 25 for connection to a manual control.

A chamber 23 is formed in the base of the cup 20, and is covered by a plate 26, secured in tight relation with the bottom of the cup 20. In the preferred construction the plate 26 comprises a thin metal disc of cupped form that is fitted into the base of the distributor housing 20 in the manner of setting a Welch plug, as is illustrated in Figs. 1 and 2. However, a very satisfactory equivalent exists in the form of a thick metal plate as 26a illustrated in Fig. 3, which may be secured in the base of the cup 20a by means of rivets 27 which coincidentally aid in securing the actuating arm 24 to the cup 20. Irrespective of the manner of anchoring the plate 26 in place, the cup has special provisions for receiving the same and for making a substantially lubricant tight joint so that when the plate 26 is in place lubricant may be added to the chamber 23 under pressure without the lubricant finding its way into the upper chamber of the cup 20 where it might interfere with the speed responsive means hereinbefore referred to. This is accomplished by providing an annular groove or rabbet 28 in the cup 20 at the outer periphery of the chamber 23, which rabbet will be of a dimension slightly less in diameter or cross dimension than that of the plate 26 to be seated therein. A central boss 34 extending interiorly of the cup 20 so as to provide a continuation of the bearing 22 has its end reduced as at 35 so as to provide a ledge 50 for reception of the inner portion of the plate 26.

The particular form of plate 26 that is preferred is that illustrated in Fig. 5 though the modified form illustrated in Fig. 4 will serve the same purpose. The particular type of plate illustrated here comprises one of dished form substantially as illustrated and having a central aperture 52 terminating in an axially extending flange 53, while its outer periphery may be said to terminate in a flange 54. The plate is purposely constructed of relatively thin material and is characterized by sufficient crowning as at 56 so that when the plate is set within the base of the cup 20 with the peripheral edge 54 resting in the groove 28 and the edge 53 resting in the groove 50, and when the crown 56 is flattened out, the plate then will take up the form illustrated in Figs. 1 and 2 wherein the flanges 53 and 54 will be expanded against, or will frictionally engage the side walls of the grooves 50 and 28 respectively, so as to form a lubricant tight joint and so as to hold the plate 26 in place.

A similar method may be used in setting the plate 26a in the base of the cup 20a, in so far as the dimensions of the plate may be such as to make a press fit in engaging the cup and the bearing portion. Through a lateral wall of the cup 20 and opening into the chamber 23, a grease gun fitting 58 is provided so that relatively hard lubricant may be forced into the chamber 23 under pressure. It will be noted from reference to Fig. 1 that the bearing 22 in fact extends through the lubricant pressure chamber 23 and is provided with apertures 29 which give access for lubricant in the chamber 23 to the surface of the shaft 40. Throughout substantially the entire extent of the bearing 22, the shank 21 is provided with an oil groove 41, which in the present instance appears as a zig-zag passage or reentrant curve represented by the full and dotted lines. This passage is broached or otherwise cut into the shank after the bearing passage is formed.

With respect to Fig. 3, in addition to showing a modified form of the sealing plate 26a, and the method of securing it to the cup 20, there is also illustrated a modification in the form of the bearing member. In this instance the bearing 22a is provided by a tubular member or auxiliary part 60 that is secured within the longitudinal bore of the shank 21. This tubular member or bearing sleeve also provides an extending portion 34a projecting through the lubricant chamber 23 and is provided with the lateral apertures 29a by which communication is made between the chamber 23 and the lubricant groove 41a provided on the inner surface of the sleeve member 60. As a still further alternative, and as was illustrated in the above referred to application, the oil groove may be provided on the exterior surface of the shaft 40 in which instance the bearing surface 22a or 22 as the case may be, would be left undisturbed. The oil groove then would have periodic communication with the lubricant passages 29 or 29a. However, it was discovered even prior to the filing of the above referred to application that a more desirable result was obtained and a more satisfactory structure would be provided if the oil passage 41 or 41a were to be cut in the bearing surface as illustrated herein.

The speed responsive means 30 comprises a weight plate 31 press fitted upon the reduced end 42 of the shaft 40, and supports a pair of pivot posts 32 upon which are pivoted weights 33, having cam faces maintained in engagement with the cam lobes of a plate 36 secured to the lower end of the cam carrying shaft 45 hereinbefore referred to, and all as is well known to those skilled in the art. Each of the arms of the plate 36 supports a spring post 37 upon which is hooked one end of a spring 38 anchored to the pivot post 32. These springs normally cant the weights 33 toward the axis of the speed responsive means, yet permit the weights 33 to fly outwardly upon rotation by the shaft 40.

As earlier stated, the shaft 40 is provided with a reduction upon which is press fitted the plate 31, as at 42, supporting the speed responsive mechanism and the shaft 40 is further reduced above the plate 31 to form a pintel or stud 43 about which is placed the lower end of the cam carrying shaft 45.

With a construction of the type disclosed herein efficient lubrication is provided for the moving parts of a distributor mechanism, and solves a much annoying problem in the construction of high speed automotive equipment. The lubricant chamber 23 is substantially sealed against outside influences of pressure and when charged with lubricant by means of a grease gun applied to the fixture 58 may be substantially filled with lubricant under pressure. When this is accomplished the charge of lubricant within the chamber 23 will be forced into the passages 29 where it will come in contact with the surface of the shaft 40, and will also have communication with the lubricant passage 41 inasmuch as at least one of these passages 29 opens into the passage 41. Thus, the lubricant within the chamber 23 will be forced along the passage 41 and will provide for the lubrication of the entire surface of the shaft 40 throughout the bearing 22 or 22a. This is particularly desirable in the form illustrated in Figs. 1 and 2, in which the bearing 22 is provided by the stock of a cast iron shank 21.

While the form of embodiment of the present invention as herein disclosed, constitutes a preferred form, it is to be understood that other forms might be adopted, all coming within the scope of the claims which follow.

What is claimed is as follows:

1. In an ignition distributor having a rotatable shaft, the combination comprising; a cup-shaped housing having an annular ledge; tubular extensions on each side of the bottom wall of the housing, said extensions being bored to provide a bearing for the shaft; grooves formed on the interior of bearing wall; a shoulder formed on the exterior surface of the extension within the housing; a cup-shaped disc having spaced annular flanges secured within the housing, the inner flange press-fitted on the outside of the shoulder of the extension and the outer annular flange press-fitted inside the annular ledge on the inner wall of the housing to provide a lubricant tight confining chamber, the enclosed extension providing cross passages by which lubricant in the confining chamber is conveyed to the grooves to lubricate the shaft surface; and means having access outside the housing for introducing lubricant under pressure into the chamber.

2. In a device for lubricating a rotatable shaft, the combination comprising; a cup-shaped housing provided with an inside annular ledge; a tubular member carried by the housing and extending above the bottom wall of the housing, said member providing a bearing for the shaft and having an outside shoulder; oil grooves formed in the inner surface of the tubular member and substantially throughout its length; a plate having spaced annular flanges secured within the housing, the inner flange press-fitted on the shoulder of the tubular member and the outer flange press-fitted inside the ledge of the housing to provide a lubricant tight confining chamber in the bottom of the housing; a cross passage through the tubular member communicating with the grooves to conduct lubricant from the chamber to the shaft surface; and means having access outside the housing for introducing lubricant under pressure into the chamber.

3. In a device for lubricating a rotatable shaft, the combination comprising; a cup-shaped housing provided with an inside annular ledge, a boss formed integral with the housing and extending above the bottom wall of the housing, said boss provided with an outside shoulder and bored to provide a bearing for the shaft, the bearing providing grooves substantially throughout its length, an apertured plate secured within the housing, said plate being press-fitted over the outside of the shoulder of the boss and within the inside of the annular ledge of the housing to provide a lubricant tight confining chamber, said boss having an opening therethrough by which lubricant in the chamber is conveyed to the bearing grooves, and means having access outside the housing for introducing lubricant under pressure into the chamber.

JOHN T. FITZSIMMONS.
JAMES L. ARTHUR.